(12) United States Patent
Kashiwagi et al.

(10) Patent No.: US 11,604,454 B2
(45) Date of Patent: Mar. 14, 2023

(54) DATA PROCESSING APPARATUS, DATA TRANSMISSION METHOD, AND RECORDING MEDIUM

(71) Applicant: Mitsubishi Electric Corporation, Tokyo (JP)

(72) Inventors: Ryo Kashiwagi, Tokyo (JP); Motoyuki Ozaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/774,146

(22) PCT Filed: Jan. 23, 2020

(86) PCT No.: PCT/JP2020/002230
§ 371 (c)(1),
(2) Date: May 4, 2022

(87) PCT Pub. No.: WO2021/149210
PCT Pub. Date: Jul. 29, 2021

(65) Prior Publication Data
US 2022/0350312 A1 Nov. 3, 2022

(51) Int. Cl.
*G05B 19/418* (2006.01)
(52) U.S. Cl.
CPC ..... *G05B 19/4185* (2013.01); *G05B 19/4183* (2013.01); *G05B 19/41865* (2013.01)
(58) Field of Classification Search
CPC ............ G05B 19/4185; G05B 19/4183; G05B 19/41865
(Continued)

(56) References Cited

U.S. PATENT DOCUMENTS

2004/0071143 A1 4/2004 Baba et al.
2014/0067900 A1 3/2014 Fukumura
(Continued)

FOREIGN PATENT DOCUMENTS

JP 5-219084 A 8/1993
JP 11-163905 A 6/1999
(Continued)

OTHER PUBLICATIONS

International Search Report and Written Opinion dated Apr. 21, 2020, received for PCT Application PCT/JP2020/002230, Filed on Jan. 23, 2020, 8 pages including English Translation.
(Continued)

*Primary Examiner* — Hien D Khuu
(74) *Attorney, Agent, or Firm* — Xsensus LLP

(57) ABSTRACT

A data processing apparatus executes a process on each piece of data repetitively transmitted from a device and transmits processing information on the process to a receiving apparatus, and includes an outputter and a GW communicator. The outputter acquires conditional information, indicating whether a transmission condition required for transmission of generation data generated in execution of the process to the receiving apparatus is satisfied, after every generation of generation data. When the conditional information indicates satisfaction of the transmission condition for the piece of generation data, the outputter outputs additional information on satisfaction or dissatisfaction of the transmission condition for at least one of another piece of generation data generated immediately before or after the piece of generation data. The GW communicator transmits the processing information including the generation data for which the condition is satisfied and the additional information to the receiving apparatus.

6 Claims, 13 Drawing Sheets

(58) Field of Classification Search
USPC .......................................................... 700/9
See application file for complete search history.

(56) References Cited

U.S. PATENT DOCUMENTS

2019/0287488 A1  9/2019  Yanagihara
2021/0311779 A1  10/2021  Ozaki et al.

FOREIGN PATENT DOCUMENTS

| JP | 2002-325099 A   |   | 11/2002 |             |
|----|-----------------|---|---------|-------------|
| JP | 2014-50091 A    |   | 3/2014  |             |
| JP | 2014050091 A    | * | 3/2014  | ......... H04L 65/4069 |
| JP | 2016-158062 A   |   | 9/2016  |             |
| JP | 6189006 B1      |   | 8/2017  |             |
| JP | 6341869 B2      | * | 6/2018  |             |
| JP | 6599064 B1      | * | 10/2019 | ........... G05B 19/042 |
| JP | 6608572 B1      |   | 11/2019 |             |

OTHER PUBLICATIONS

Decision to Grant dated Oct. 6, 2020, received for JP Application 2020-535262, 5 pages including English Translation.

* cited by examiner

FIG. 6

| CONDITION SETTING INFORMATION 51 ||
|---|---|
| TRANSMISSION CONDITION | VALUE OF GENERATION DATA IS AT LEAST 0 |

FIG. 7

| TIME STAMP | VALUE OF GENERATION DATA | CONDITIONAL INFORMATION | DETECTION RESULT | ADDITIONAL INFORMATION | | |
|---|---|---|---|---|---|---|
| | | | | TRANSMISSION FLAG | START FLAG | END FLAG |
| ⋮ | ⋮ | ⋮ | ⋮ | ⋮ | ⋮ | ⋮ |
| 2019/12/01 15:34:56 | 1 | True | False | TRANSMISSION (1) | – (0) | – (0) |
| 2019/12/01 15:34:57 | 3 | True | False | TRANSMISSION (1) | – (0) | – (0) |
| 2019/12/01 15:34:58 | –1 | False | True | – (0) | – (0) | END (1) |
| 2019/12/01 15:34:59 | 2 | True | False | TRANSMISSION (1) | START (1) | – (0) |
| 2019/12/01 15:35:00 | –3 | False | True | – (0) | – (0) | END (1) |
| 2019/12/01 15:35:01 | –4 | False | False | – (0) | – (0) | – (0) |
| 2019/12/01 15:35:02 | 5 | True | False | TRANSMISSION (1) | START (1) | – (0) |
| 2019/12/01 15:35:03 | 2 | True | False | TRANSMISSION (1) | – (0) | – (0) |
| 2019/12/01 15:35:04 | 1 | True | False | TRANSMISSION (1) | – (0) | – (0) |
| ⋮ | ⋮ | ⋮ | ⋮ | ⋮ | ⋮ | ⋮ |

FIG. 10

| TIME STAMP | VALUE OF GENERATION DATA | CONDITIONAL INFORMATION | DETECTION RESULT | ADDITIONAL INFORMATION | |
|---|---|---|---|---|---|
| | | | | TIME STAMP | GENERATION DATA |
| ⋮ | ⋮ | ⋮ | ⋮ | ⋮ | ⋮ |
| 2019/12/01 15:34:56 | 1 | True | False | – | – |
| 2019/12/01 15:34:57 | 3 | True | False | – | – |
| 2019/12/01 15:34:58 | –1 | False | True | 2019/12/01 15:34:57 | 3 |
| 2019/12/01 15:34:59 | 2 | True | False | – | – |
| 2019/12/01 15:35:00 | –3 | False | True | 2019/12/01 15:34:59 | 2 |
| 2019/12/01 15:35:01 | –4 | False | False | – | – |
| 2019/12/01 15:35:02 | 5 | True | False | – | – |
| 2019/12/01 15:35:03 | 2 | True | False | – | – |
| 2019/12/01 15:35:04 | 1 | True | False | – | – |
| ⋮ | ⋮ | ⋮ | ⋮ | ⋮ | ⋮ |

FIG. 11

| CONDITION SETTING INFORMATION | |
|---|---|
| TRANSMISSION INITIATION CONDITION | CURRENT TIME HAS PASSED PREDETERMINED TIME POINT |
| TRANSMISSION TERMINATION CONDITION | VALUE OF GENERATION DATA IS AT LEAST 0 |

FIG. 12

| TIME STAMP | VALUE OF GENERATION DATA | CONDITIONAL INFORMATION | DETECTION RESULT | ADDITIONAL INFORMATION |
|---|---|---|---|---|
| ⋮ | ⋮ | ⋮ | ⋮ | ⋮ |
| 2019/12/01 15:34:56 | 1 | True | False | 12 |
| 2019/12/01 15:34:57 | 3 | True | False | 13 |
| 2019/12/01 15:34:58 | -1 | False | True | - |
| 2019/12/01 15:34:59 | 2 | True | False | 1 |
| 2019/12/01 15:35:00 | -3 | False | True | - |
| 2019/12/01 15:35:01 | -4 | False | False | - |
| 2019/12/01 15:35:02 | 5 | True | False | 1 |
| 2019/12/01 15:35:03 | 2 | True | False | 2 |
| 2019/12/01 15:35:04 | 1 | True | False | 3 |
| ⋮ | ⋮ | ⋮ | ⋮ | ⋮ |

DATA PROCESSING APPARATUS, DATA TRANSMISSION METHOD, AND RECORDING MEDIUM

CROSS-REFERENCE TO RELATED APPLICATION

The present application is based on PCT filing PCT/JP2020/002230, Jan. 23, 2020, the entire contents of which are incorporated herein by reference.

TECHNICAL FIELD

The present disclosure relates to a data processing apparatus, a data transmission method, and a program.

BACKGROUND ART

In the field of factory automation (FA), processing systems are established to process data collected from devices, represented by sensors, in real time. The recent advance of communication technology induces a demand for remote use of data on processes in this type of processing systems. In view of this demand, a part of the data on the processes is preferably extracted and then transmitted to the outside, because skipping the transmission of unnecessary data can facilitate remote use of the data. A conceivable solution is to apply a technique of transmitting data to the outside in accordance with predetermined output conditions to a processing system (for example, refer to Patent Literature 1).

Patent Literature 1 discloses a stream processing apparatus to receive a packet containing sensor data measured by a sensor included in a device, and execute protocol processing and query processing in parallel. When the value of the sensor data is within an allowable range in the query processing, the stream processing apparatus determines the device to be normal and transmits a normal notification signal. In other cases, the stream processing apparatus determines the device to be abnormal and transmits a device stop signal. In accordance with output conditions, the stream processing apparatus does not output and discards a result of the query processing that corresponds to the packet determined to be an error in the protocol processing. This apparatus skips the transmission of defective data that may cause an error in the protocol processing.

CITATION LIST

Patent Literature

Patent Literature 1: Unexamined Japanese Patent Application Publication No. 2014-50091

SUMMARY OF INVENTION

Technical Problem

In the technique disclosed in Patent Literature 1, a data receiver cannot determine whether the operations of outputting results of repetitively executed query processing are successively performed, or interrupted once and then resumed. The data receiver thus cannot readily use the data for different purposes depending on whether the operations are successively executed. That is, the convenience can be further improved in remote use of information on a process applied to data collected from a device.

An objective of the present disclosure is to improve the convenience in remote use of information on a process applied to data collected from a device.

Solution to Problem

In order to achieve the above objective, a data processing apparatus according to an aspect of the present disclosure is configured to execute a process on each piece of device data repetitively transmitted from a device and transmit processing information on the process to a receiving apparatus. The data processing apparatus includes: output means for acquiring conditional information after every generation of a piece of generation data generated in execution of the process, the conditional information indicating whether a condition for transmission of the piece of generation data to the receiving apparatus is satisfied, and, when the conditional information indicates satisfaction of the condition with respect to the piece of generation data, outputting additional information on satisfaction or dissatisfaction of the condition with respect to at least one of another piece of generation data generated immediately before the one piece of generation data or another piece of generation data generated immediately after the one piece of generation data; and transmission means for transmitting the processing information to the receiving apparatus, the processing information including the piece of generation data with respect to which the condition is satisfied and the additional information.

Advantageous Effects of Invention

In the data processing apparatus according to an aspect of the present disclosure, when the conditional information indicates satisfaction of the condition with respect to one piece of generation data, the output means outputs the additional information on satisfaction or dissatisfaction of the condition with respect to at least one of another piece of generation data generated immediately before the one piece of generation data and another piece of generation data generated immediately after the one piece of generation data, and the transmission means transmits the processing information containing the one piece of generation data with respect to which the condition is satisfied and the additional information, to the receiving apparatus. The additional information enables the receiving apparatus to determine whether the one piece of generation data is transmitted in succession with another piece of generation data. This configuration can therefore improve the convenience in remote use of information on the process applied to the data collected from the device.

BRIEF DESCRIPTION OF DRAWINGS

FIG. 6 illustrates an example of condition setting information according to Embodiment 1;

FIG. 7 illustrates an example of information acquired and generated at an outputter according to Embodiment 1;

FIG. 10 illustrates an example of information acquired and generated at an outputter according to Embodiment 2;

FIG. 11 illustrates condition setting information according to a modification;

FIG. 12 illustrates an example of information acquired and generated at an outputter according to a modification.

DESCRIPTION OF EMBODIMENTS

A data processing system 1000 according to embodiments are described in detail below with reference to the accompanying drawings.

Embodiment 1

Figure 1:
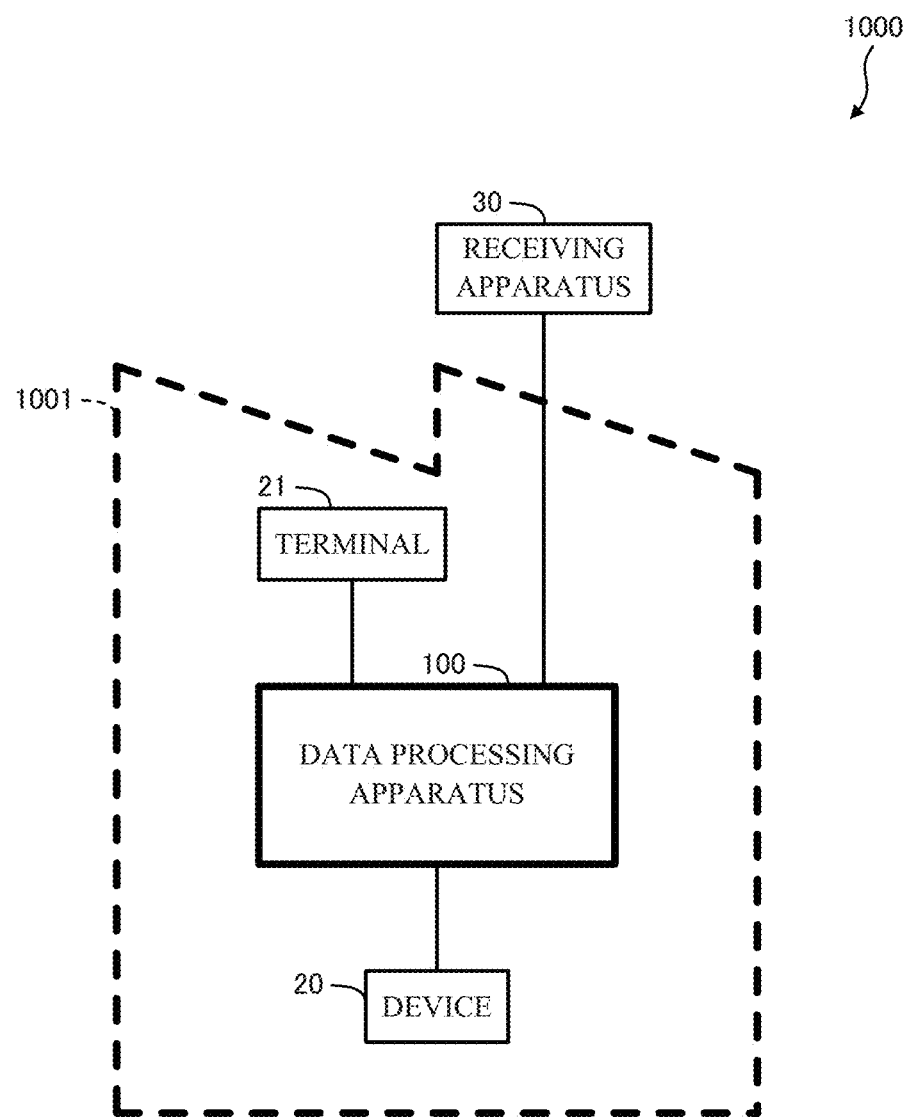
FIG. 1 illustrates a configuration of a data processing system according to Embodiment 1.

With reference to FIG. 1, the data processing system 1000 according to this embodiment is a production system that causes a data processing apparatus 100 to sequentially process data repetitively transmitted from a device 20 and thereby operates a production line in a factory 1001. Examples of data processes in the data processing system 1000 include control and monitoring of abnormalities for various devices, represented by actuators, robots, and machine tools, installed in the production line. The data processing system 1000 includes the data processing apparatus 100 to process data, the device 20 to provide the data processing apparatus 100 with data to be processed, a terminal 21 for setting of the details of the processes executed at the data processing apparatus 100, and a receiving apparatus 30 to receive information on the processes from the data processing apparatus 100 and use the information. In this data processing system 1000, information on a part of the processes repetitively executed at the data processing apparatus 100 is transmitted to the receiving apparatus 30, and information indicating whether the part of the processes is executed in succession with another part of the processes is also provided to the receiving apparatus 30.

The data processing apparatus 100 and the device 20 are connected to each other via an industrial FA network. The data processing apparatus 100 and the terminal 21 are connected to each other via a communication line, represented by a universal serial bus (USB) cable or a local area network (LAN) cable. The data processing apparatus 100 and the receiving apparatus 30 are connected to each other via a communication network, represented by the Internet. The data processing apparatus 100 transmits and receives signals to and from the device 20, the terminal 21, and the receiving apparatus 30, and thereby performs communication therewith. The above-described communication mode between the data processing apparatus 100 and the device 20, the terminal 21, and the receiving apparatus 30 is a mere example and may be arbitrarily modified.

The device 20 includes a sensor, which is not illustrated, installed in the production line. Examples of the sensor include optical sensors, pressure sensors, ultrasonic sensors, and other detectors. The device 20 transmits data, containing a sensing result provided from the sensor, to the data processing apparatus 100 repetitively in a period designated by the data processing apparatus 100.

The data processing apparatus 100 is an industrial personal computer (IPC) or programmable logic controller (PLC). The data processing apparatus 100 is an FA apparatus to execute a predetermined process on the data collected from the device 20 and output a result of the process. The data processing apparatus 100 transmits an operational instruction to the device, as a result of the process, although this configuration is a mere example. The data processing apparatus 100 may also present quality-control information generated through analysis or modification of data to a user, or output another result of the process.

Figure 2:
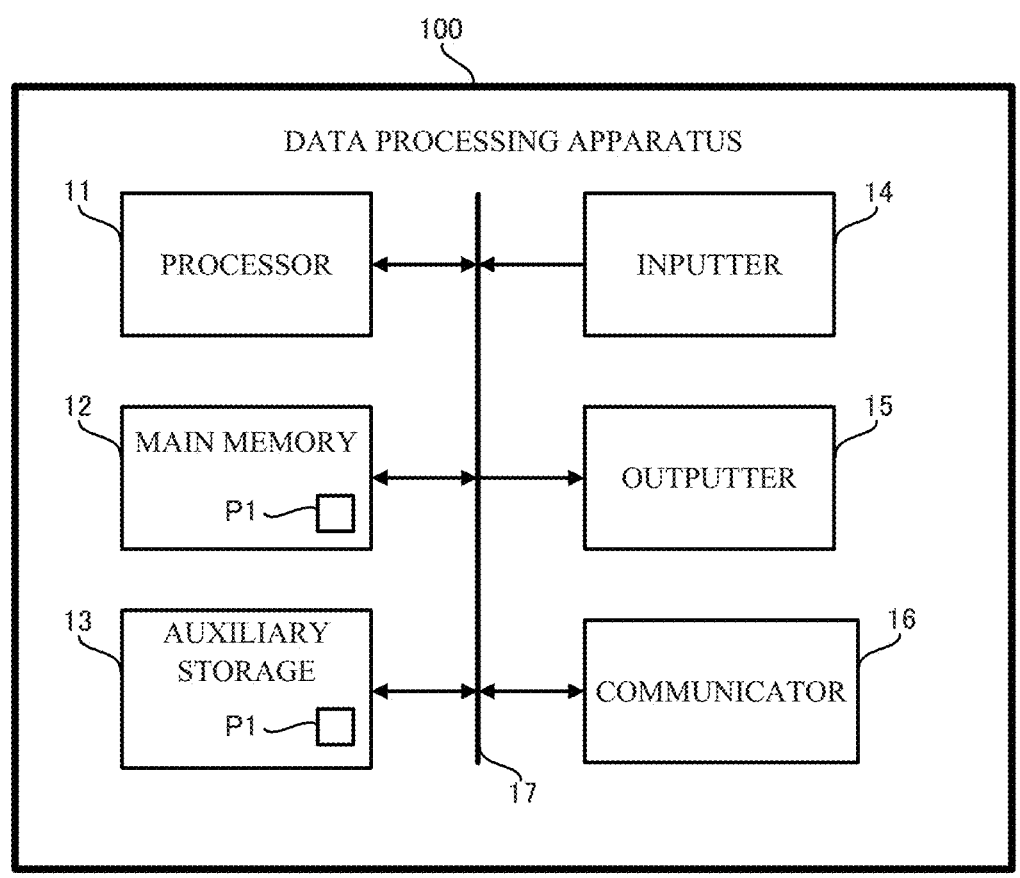
FIG. 2 illustrates a hardware configuration of a data processing apparatus according to Embodiment 1.

With reference to FIG. 2, the data processing apparatus 100 is a computer device having a hardware configuration including a processor 11, a main memory 12, an auxiliary storage 13, an inputter 14, an outputter 15, and a communicator 16. The main memory 12, the auxiliary storage 13, the inputter 14, the outputter 15, and the communicator 16 are each connected to the processor 11 via internal buses 17.

The processor 11 includes a micro processing unit (MPU). The processor 11 executes a program P1 stored in the auxiliary storage 13 and thereby performs various functions of the data processing apparatus 100 and executes processes described below.

The main memory 12 includes a random access memory (RAM). The program P1 is loaded from the auxiliary storage 13 into the main memory 12. The main memory 12 serves as a work area of the processor 11.

The auxiliary storage 13 includes a non-volatile memory, represented by an electrically erasable programmable read-only memory (EEPROM). The auxiliary storage 13 stores the program P1 and various types of data used in processes in the processor 11. The auxiliary storage 13 provides the processor 11 with the data to be used by the processor 11 and stores data fed from the processor 11 under the instructions from the processor 11. Although FIG. 2 illustrates a single program P1 as a representative, the auxiliary storage 13 may store a plurality of programs P1. The programs P1 may include both of a program preliminarily set in the data processing apparatus 100 and a program added by the user of the data processing apparatus 100.

The inputter 14 includes an input device, represented by an input key or pointing device. The inputter 14 acquires information input by the user of the data processing apparatus 100 and provides the acquired information to the processor 11.

The outputter 15 includes an output device, represented by a liquid crystal display (LCD) or speaker. The outputter 15 presents various types of information to the user under the instructions from the processor 11.

The communicator 16 includes a network interface circuit to communicate with the external device 20. The communicator 16 receives signals from the device 20 and outputs data indicated by the signals to the processor 11. The communicator 16 also transmits signals indicating the data output from the processor 11 to the device 20. Although FIG. 2 illustrates a single communicator 16 as a representative, the data processing apparatus 100 may also include a plurality of communicators 16 corresponding to the communication paths to which the communicators 16 are connected.

The cooperation of the components of the hardware configuration illustrated in FIG. 2 enables the data processing apparatus 100 to perform various functions including processing of data. The processing of data in the data processing apparatus 100 is arbitrarily defined by the user in the form of a processing flow 300 involving a series of subprocesses to be sequentially executed, as in the example illustrated in FIG. 3.

The processing flow 300 involves subprocesses to be sequentially executed on the data output from the device 20. In detail, the processing flow 300 involves subprocesses including a collection process 31 of collecting data to be subject to the processing flow 300 from the device 20, a first modification process 32 of providing a first modification on the collected data, a second modification process 33 of providing a second modification on the data resulting from the first modification, a diagnostic process 34 of providing a diagnosis on the basis of the data resulting from the second modification, and a third modification process 35 of providing a third modification on the data resulting from the first modification. In addition to these subprocesses, the processing flow 300 is achieved by executing any of the subprocesses of transmitting information to the receiving apparatus 30, which include an external transmission process 41 of transmitting a result of the collection process 31, an external transmission process 42 of transmitting a result of the third modification process 35, and an external transmission process 43 of transmitting a result of the diagnostic process, in the order represented by the arrows in FIG. 3.

Figure 3:
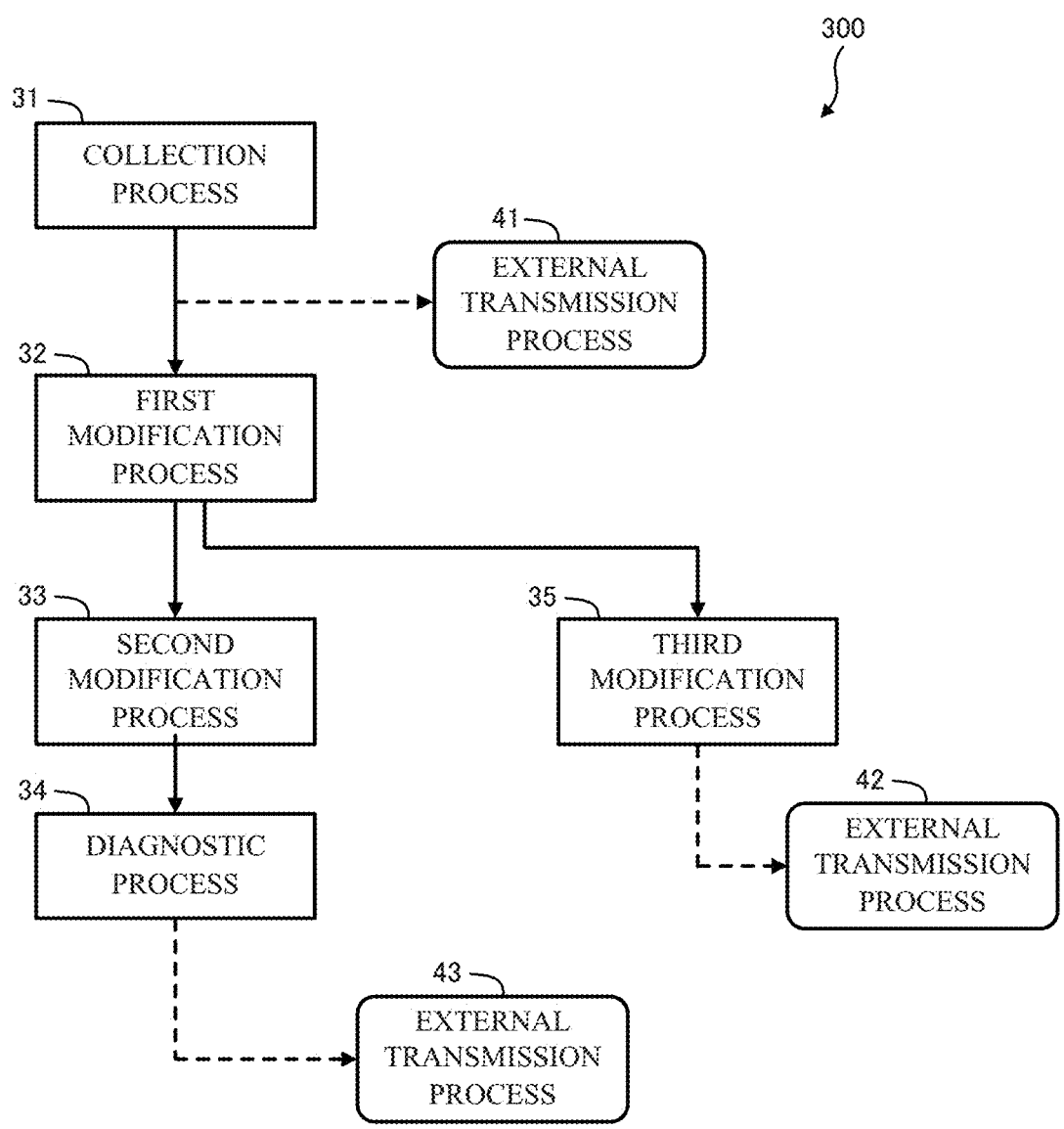
FIG. 3 is a diagram for describing a processing flow executed in the data processing apparatus according to Embodiment 1.

The arrows in FIG. 3 represent transfer of data to be subject to the individual subprocesses. For example, the data acquired from the outside of the data processing apparatus 100 through the collection process 31 is input to the first modification process 32, and the input data is then subject to the first modification process 32. The data indicating a result of the first modification process 32 is input to the second modification process 33 or the third modification process 35, and the input data is then subject to the second modification process 33 or the third modification process 35. The data indicating a result of the second modification process 33 is input to the diagnostic process 34, and the input data is then subject to the diagnostic process 34.

The collection process 31 corresponds to a subprocess of receiving signals from the device 20 and thereby collecting data. The collection process 31 is periodically executed in accordance with predetermined parameters, to acquire a sensing result transmitted from the device 20. Examples of the period include ten milliseconds, 100 milliseconds, and one second. The data indicating the sensing result has an 8-bit or 16-bit digital value, for example. Every acquisition of data from the device 20 through the collection process 31 is followed by the subsequent subprocesses, resulting in repetitive execution of the processing flow 300.

The first modification process 32 is a subprocess of calculating a moving average and thereby removing noise. The second modification process 33 is a normalization subprocess of making a value to be processed within a predetermined range. The diagnostic process 34 is a subprocess of determining the details of a control command directed to the device depending on the result of the second modification process 33 and outputting the control command. These subprocesses can achieve control of the device depending on the sensing result.

The third modification process 35 is a subprocess of extracting an abnormal value from the values to be processed and recording the abnormal value. The third modification process 35 can achieve generation of quality-control information, thereby improving the efficiency of the production line.

The external transmission process 41 is executed after every generation of data indicating a result of the collection process 31. The external transmission process 42 is executed after every generation of data indicating a result of the third modification process 35, to transmit information equal to the information recorded through the third modification process 35. The external transmission process 43 is executed after every generation of data indicating a result of the diagnostic process 34, to transmit information equal to the control command output through the diagnostic process 34. The external transmission subprocesses 41 to 43 are each a subprocess of transmitting generated data to the receiving apparatus 30 in real time. Although the processing flow 300 may involve a plurality of external transmission subprocesses 41 to 43, the following description is directed to an example in which the processing flow 300 involves the external transmission process 42 without the external transmission process 41 or 43.

The above-described configuration of the processing flow 300 is a mere example. For example, the first modification process 32, the second modification process 33, the diagnostic process 34, and the third modification process 35 are not necessarily identical to the above-described subprocesses. The number of subprocesses may be arbitrarily varied, and the connections between the subprocesses represented by the arrows in FIG. 3 may be arbitrarily modified. The processing flow 300 may contain a branch at which a result of a single subprocess is input to three or more other subprocesses, or a confluence at which results of multiple subprocesses are input to a single subprocess.

The processing flow 300 is executed in response to input of each piece of data to be subject to the processing flow 300, and the subprocesses involved in the processing flow 300 are each executed as a part of the processing flow. For example, the subprocesses are sequentially executed on one piece of data transmitted from the device 20, and the same subprocesses are independently executed on another piece of subsequently transmitted data. The subprocesses on one piece of data are executed in parallel to the subprocesses on the subsequent piece of data. In other words, the processing flow 300 on the subsequent piece of data is started before completion of the processing flow 300 on the one piece of data. This configuration is a mere example, and the data processing apparatus 100 may start the subsequent processing flow 300 after completion of the previous processing flow 300.

Figure 4:
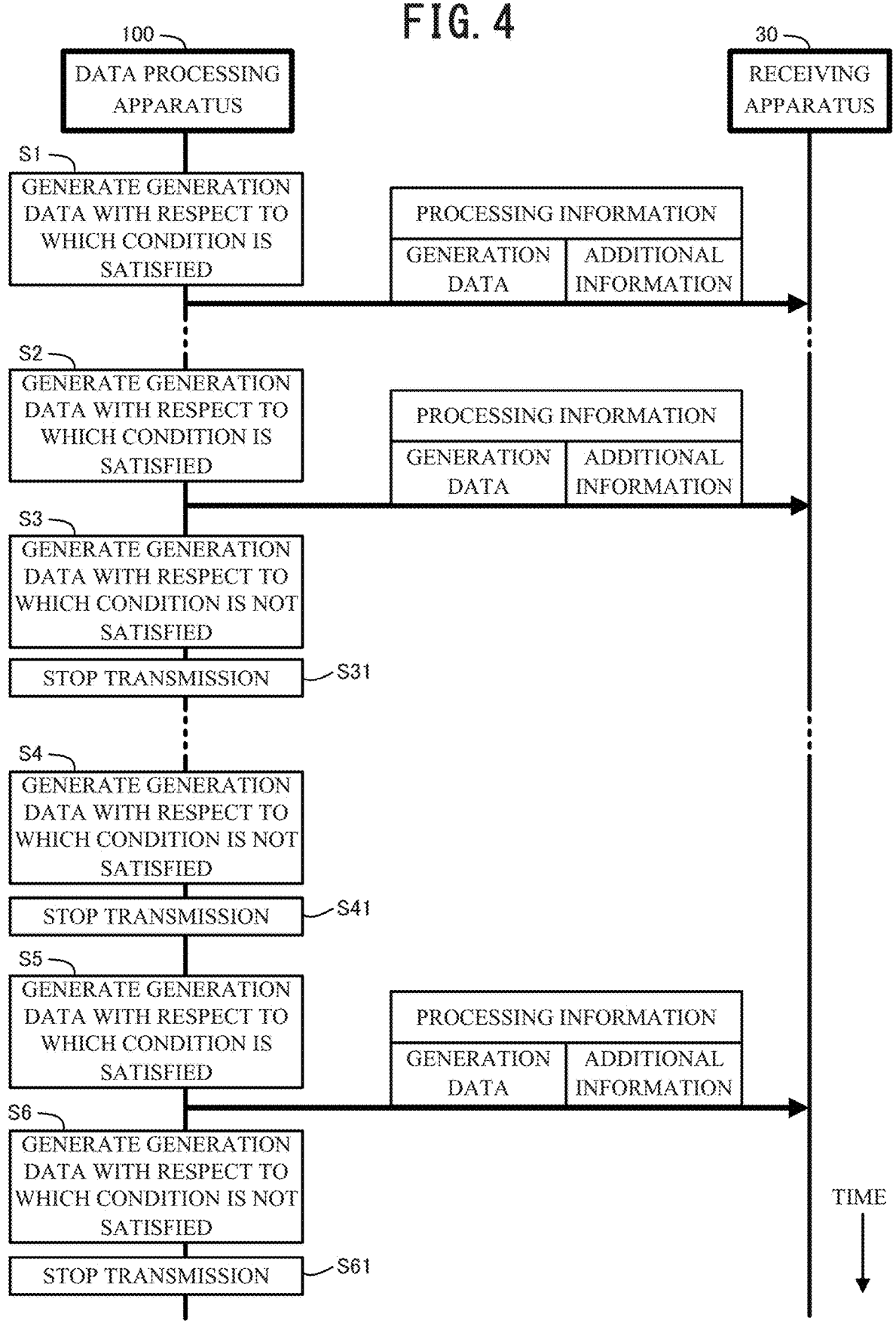
FIG. 4 is a diagram for describing transmission of processing information according to Embodiment 1.

As illustrated in FIG. 4, when a predetermined condition is satisfied with respect to one piece of generation data, which is generated as a result of the subprocesses during execution of the process flow, then the data processing apparatus 100 transmits the piece of generation data to the receiving apparatus 30 as processing information, which also contains additional information. The additional information indicates whether another piece of generation data generated before or after the one piece of generation data is transmitted to the receiving apparatus 30 together with the one piece of generation data. In FIG. 4, after every generation of generation data with respect to which the condition is satisfied, the data processing apparatus 100 transmits this generation data together with the additional information (Steps S1 to S2 and S5). In the case of generation data with respect to which the condition is not satisfied (Steps S3 to S4 and S6), the data processing apparatus 100 stops transmission of this generation data (Steps S31 and S41).

FIG. 4 is just a schematic diagram illustrating transmission of processing information from the data processing apparatus 100, and the processing information may also be transmitted in other modes. For example, although the data processing apparatus 100 stops transmission of generation data with respect to which the condition is not satisfied in general, the data processing apparatus 100 may transmit processing information with respect to which the condition is not satisfied when this transmission is immediately after transmission of another piece of generation data with respect to which the condition is satisfied (Steps S3 and S6), as described below.

Figure 5:
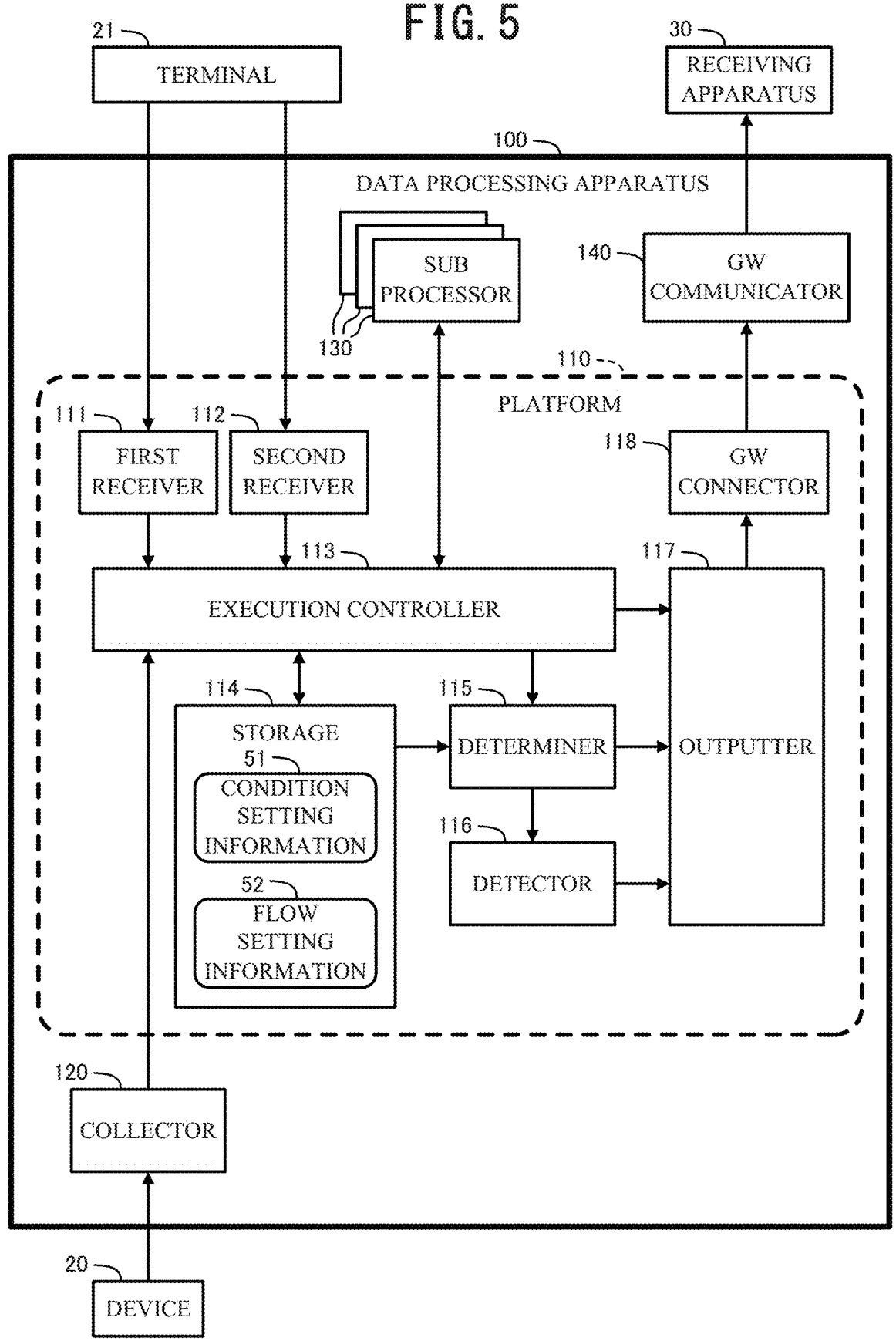
FIG. 5 illustrates a functional configuration of the data processing apparatus according to Embodiment 1.

In order to achieve the processing flow and transmission of processing information on this processing flow, as illustrated in FIG. 5, the data processing apparatus 100 has functional configurations including a first receiver 111 to receive setting of a transmission condition required for transmission of generation data to the receiving apparatus 30, a second receiver 112 to receive setting of the processing flow, an execution controller 113 to control execution of the processing flow in accordance with the setting, a storage 114 to store various types of data, a determiner 115 to determine whether the transmission condition is satisfied after every generation of generation data, a detector 116 to detect switching between satisfaction and dissatisfaction of the transmission condition with respect to pieces of sequentially generated generation data, an outputter 117 to generate and output processing information on the processing flow, and a GW connector 118 to output the processing information to a gateway (GW) communicator 140. The first receiver 111, the second receiver 112, the execution controller 113, the storage 114, the determiner 115, the detector 116, the outputter 117, and the GW connector 118 constitute a platform 110 that allows the user to execute a desired processing flow.

The data processing apparatus 100 further includes a collector 120 to collect data from the device 20, a plurality of subprocessors 130 to execute subprocesses, and the GW communicator 140 to serve as a gateway for transmission of processing information to the receiving apparatus 30.

The first receiver 111 receives setting of the transmission condition from the terminal 21, which is input by the user's operation at the terminal 21. For example, the first receiver 111 receives a transmission condition required for transmission of generation data, indicating a result of the third modification process 35 in FIG. 3, to the receiving apparatus 30. The transmission condition may be switched between satisfaction and dissatisfaction after every generation of generation data indicating a result of the subprocesses. A typical example of the transmission condition is that the value of the generation data is out of a predetermined range. This transmission condition is a mere example, and may also be a condition of which satisfaction or dissatisfaction depends on a result of another subprocess at the time of generation of generation data through the third modification process 35, or a condition that the current time has passed a predetermined time point, for example. The first receiver 111 outputs condition setting information 51 indicating the received setting of the transmission condition to the execution controller 113, and the execution controller 113 causes the condition setting information 51 to be stored into the storage 114.

The second receiver 112 receives the setting of the processing flow defined by the user. The second receiver 112 then outputs flow setting information 52 indicating the details of the processing flow to the execution controller 113, and the execution controller 113 causes the flow setting information 52 to be stored into the storage 114.

The first receiver 111 and the second receiver 112 are each mainly achieved by cooperation of the processor 11 and the communicator 16. The first receiver 111 corresponds to an example of first reception means in the data processing apparatus 100 for receiving a condition required for transmission of generation data generated during execution of the process to the receiving apparatus 30. The second receiver 112 corresponds to an example of second reception means in the data processing apparatus 100 for receiving setting of the processing flow defined for each piece of device data transmitted from the device 20.

The terminal 21 is a graphical user interface (GUI) terminal to allow the user of the data processing apparatus 100 to input information. The terminal 21 executes application software, which is called an engineering tool, used for defining the setting of the processing flow, and thereby performs functions as GUI.

The execution controller 113 controls the collector 120 and the subprocessors 130 and thereby executes the defined processing flow. In detail, the execution controller 113 acquires data collected at the collector 120. The execution controller 113 then outputs the acquired data to any of the subprocessors 130, acquires a result of the subprocess from the subprocessor 130, and causes the subprocessors 130 to execute subprocesses in the order in accordance with the processing flow. The execution controller 113 outputs the generation data to the determiner 115 and the outputter 117, and thereby executes the external transmission process 42 in FIG. 3.

The storage 114 is mainly achieved by at least one of the main memory 12 and the auxiliary storage 13. The storage 114 may also temporarily store data to be addressed at the execution controller 113, in addition to the condition setting information 51 and the flow setting information 52. FIG. 6 illustrates an example of the condition setting information 51 stored in the storage 114, which indicates a transmission condition that is satisfied when the value of the generation data is at least 0.

The determiner 115 reads the condition setting information 51 from the storage 114, and acquires generation data from the execution controller 113 after every generation of generation data. The determiner 115 then determines whether the transmission condition is satisfied with respect to the acquired generation data, and outputs conditional information indicating whether the transmission condition is satisfied to the detector 116 and the outputter 117. For example, after every acquisition of generation data, the determiner 115 outputs conditional information indicating dissatisfaction of the transmission condition when the value of the generation data is within the predetermined range, and outputs conditional information indicating satisfaction of the transmission condition when the value of the generation data is out of the predetermined range. The conditional information has a value of True corresponding to satisfaction of the transmission condition or a value of False corresponding to dissatisfaction of the transmission condition, for example.

The detector 116 repetitively acquires pieces of conditional information from the determiner 115, and detects the switching between satisfaction and dissatisfaction of the transmission condition indicated by the conditional information. The detector 116 is only required to at least one of the switching from satisfaction to dissatisfaction of the transmission condition and the switching from dissatisfaction to satisfaction of the transmission condition. The switching from satisfaction to dissatisfaction of the transmission condition corresponds to the last piece of generation data among a single piece or successive pieces of generation data to be transmitted, while the switching from dissatisfaction to satisfaction of the transmission condition corresponds to the first piece of generation data among a single piece or successive pieces of generation data to be transmitted. The first piece of generation data and the last piece of generation data are hereinafter referred to as "start" and "end", respectively. The detector 116 detects an edge, which is at least one of the start and the end. The detector 116 then outputs a result of detection to the outputter 117. The detection result contains the value of True corresponding to detection of the end, or the value of False corresponding to non-detection of the end, for example. Alternatively, the detection result may contain the value of True corresponding to detection of the start, or the value of False corresponding to non-detection of the start.

The outputter 117 generates and outputs processing information to be transmitted to the receiving apparatus 30. In detail, the outputter 117 acquires a piece of generation data from the execution controller 113, acquires conditional information on this piece of generation data from the determiner 115, and acquires a result of detection at the detector 116 from the detector 116 on the basis of the conditional information. The outputter 117 then generates additional information on the basis of the conditional information and the detection result, and outputs processing information containing the generation data and the additional information to the GW connector 118 when the transmission condition is satisfied.

FIG. 7 illustrates information acquired at the outputter 117 and additional information generated at the outputter 117 in the chronological order. A time stamp in FIG. 7 is associated with each piece of generation data and output from the execution controller 113 to the outputter 117. The time stamp may indicate time of generation of generation data, time of start of the processing flow of generating generation data, or time of reception of data to be subject to the processing flow from the device 20.

Some of the results of detection illustrated in FIG. 7 indicate the switching from satisfaction to dissatisfaction of the transmission condition. In detail, a detection result indicates "True" when acquisition of conditional information indicating "True" is followed by acquisition of conditional information indicating "False", and indicates "False" in the other cases.

The additional information illustrated in FIG. 7 contains a transmission flag, a start flag, and an end flag associated with each other. The transmission flag is a 1-bit flag having a value of "1" in the case of conditional information indicating "True", and having a value of "0" in the case of conditional information indicating "False". The transmission flag is substantially equal to the conditional information. The start flag is a 1-bit flag having a value of "1" in the case where the transmission flag associated with this start flag is "1" and the previous transmission flag is "0", and having a value of "0" in the other cases. When the detector 116 outputs a detection result indicating the switching from dissatisfaction to satisfaction of the transmission condition, the start flag is substantially equal to this detection result. The end flag is a 1-bit flag having a value of "1" in the case where the detection result illustrated in FIG. 7 indicates "True", and having a value of "0" in the case where the detection result indicates "False". The end flag is substantially equal to the detection result illustrated in FIG. 7.

The generation data and the additional information are output in the case of the transmission flag indicating "1", or in the case of the end flag indicating "1" regardless of the transmission flag indicating "0", and are discarded without being output in the other cases. That is, when any one of the transmission flag, the start flag, and the end flag indicates "1", the data processing apparatus 100 transmits the generation data and the additional information. In FIG. 7, the items corresponding to the information output from the outputter 117 are underlined. The generation data provided with the end flag indicating "1" does not satisfy the transmission condition but is transmitted as information indicating that the previously generated generation data corresponds to the end. In other words, the piece of generation data corresponding to the end with respect to which the transmission condition is satisfied is provided with subsequently generated generation data and additional three flags as additional information indicating the end, in addition to the three flags illustrated in FIG. 7 generated in association with the piece of generation data corresponding to the end.

Referring back to FIG. 5, the GW connector 118 serves as an interface of the platform 110. The GW connector 118 acquires processing information containing generation data and additional information associated with this generation data, from the outputter 117, and outputs the processing information to the GW communicator 140.

The execution controller 113, the determiner 115, the detector 116, the outputter 117, and the GW connector 118 are each mainly achieved by the processor 11. The execution controller 113 corresponds to an example of execution control means in the data processing apparatus 100 for causing processing means to execute subprocesses in accordance with the setting. The determiner 115 corresponds to an example of determination means in the data processing apparatus 100 for determining whether the condition is satisfied after every generation of generation data and outputting conditional information. The detector 116 corresponds to an example of detection means in the data processing apparatus 100 for acquiring conditional information after every generation of generation data and detecting switching between satisfaction and dissatisfaction of the condition indicated by the conditional information. The outputter 117 corresponds to an example of output means for acquiring the conditional information after every generation of generation data, and, when the conditional information indicates satisfaction of the condition with respect to one piece of generation data, outputting additional information on satisfaction or dissatisfaction of the condition with respect to at least one of another piece of generation data generated immediately before the one piece of generation data and another piece of generation data generated immediately after the one piece of generation data.

The collector 120 is mainly achieved by cooperation of the processor 11 and the communicator 16. In detail, the collector 120 is achieved because the processor 11 executes plug-in software as the program P1. The collector 120 receives pieces of data repetitively transmitted from the device 20 and outputs the received pieces of data to the execution controller 113. In detail, the collector 120 acquires data transferred in accordance with the protocols of an industrial network, converts the acquired data into a format suitable for the execution controller 113, and then outputs the converted data to the execution controller 113. The plug-in software for achieving the collector 120 is developed depending on the type of the industrial network. In the case where the data processing apparatus 100 needs to be connected to an industrial network in accordance with new protocols, a collector 120 achieved by newly developed plug-in software is introduced. Alternatively, the collector 120 may transmit a control command as a result of the processing flow to the device via the industrial network, in accordance with instructions from the execution controller 113.

The subprocessors 130 are mainly achieved by the processor 11. In detail, the subprocessors 130 are achieved because the processor 11 executes plug-in software as the program P1. The plug-in software for achieving the subprocessors 130 may be developed by the user of the data processing apparatus 100, or provided by another developer and installed by the user in the data processing apparatus 100. The result of the subprocesses at the subprocessors 130 is thus used by not only the user of the data processing apparatus 100 but also a developer other than the user as feedback information. The subprocessors 130 output, to the execution controller 113, a result of the subprocesses on the data input from the execution controller 113.

The subprocessors 130 illustrated in FIG. 5 may correspond to the respective subprocesses illustrated in FIG. 3, although this configuration is a mere example. For example, a single subprocessor 130 may execute the second modification process 33 and the third modification process 35 in accordance with parameters provided from the execution controller 113. The number of the subprocessors 130 may differ from the number of subprocesses involved in the processing flow. The subprocessors 130 each correspond to an example of the processing means m the data processing apparatus 100 for executing subprocesses.

The GW communicator 140 is mainly achieved by the communicator 16. The GW communicator 140 transmits the processing information output from the GW connector 118, to the receiving apparatus 30. The GW communicator 140 corresponds to an example of transmission means in the data processing apparatus 100 for transmitting processing information containing one piece of generation data and additional information to the receiving apparatus.

The receiving apparatus 30 corresponds to a so-called cloud server on the Internet. A result of processing generation data at the receiving apparatus 30 may be transmitted to the execution controller 113 via the GW communicator 140. That is, the receiving apparatus 30 may execute a subprocess involved in the processing flow, like the subprocessors 130.

Figure 8:
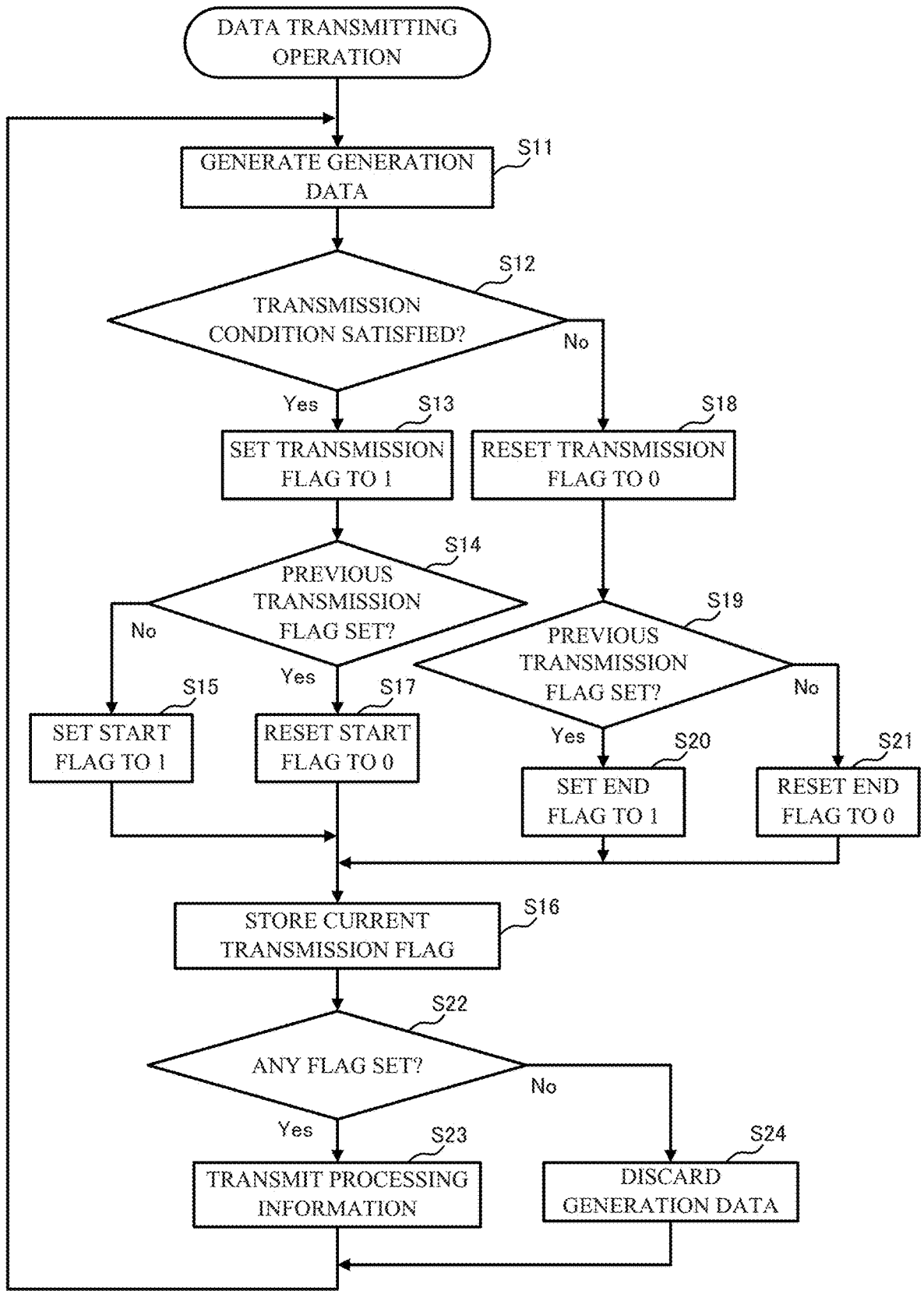
FIG. 8 is a flowchart illustrating a data transmitting operation executed in the data processing apparatus according to Embodiment 1.

A data transmitting operation executed in the data processing apparatus 100 is described below with reference to FIG. 8. The data transmitting operation illustrated in FIG. 8 is started in response to execution of the processing flow in the data processing apparatus 100.

In the data transmitting operation, the data processing apparatus 100 generates generation data (Step S11). Specifically, the execution controller 113 causes the subprocessors 130 to execute subprocesses in accordance with the flow setting information 52, and acquires the resulting generation data from the subprocessors 130.

The data processing apparatus 100 then determines whether the transmission condition specified in the condition setting information 51 is satisfied with respect to the generation data generated in Step S11 (Step S12). Specifically, the determiner 115 determines whether the value of the generation data is out of the predetermined range, and outputs conditional information indicating satisfaction or dissatisfaction of the transmission condition to the outputter 117.

When determining that the transmission condition is satisfied (Step S12; Yes), the data processing apparatus 100 sets the transmission flag to "1" (Step S13). Specifically, when the outputter 117 acquires conditional information indicating the value of "True" from the determiner 115, the outputter 117 sets the transmission flag to "1".

The data processing apparatus 100 then determines whether the previous transmission flag has been set (Step S14). Specifically, the outputter 117 determines whether the transmission flag has been set to "1" in accordance with the determination in Step S12 of the previous operation. In the case where the detector 116 is configured to provide a notification of a detection result indicating the start, the outputter 117 may determine whether any notification of non-detection of the start has been provided in Step S14.

When determining that the previous transmission flag has not been set (Step S14; No), the outputter 117 determines that the transmission condition has been switched from dissatisfaction to satisfaction, and sets the start flag to "1" (Step S15). The outputter 117 then causes the current transmission flag to be stored, which will be referred to in Steps S14 and S19 of the subsequent operation (Step S16).

In contrast, when determining that the previous transmission flag has been set (Step S14; Yes), the outputter 117 determines that the transmission condition has been satisfied since the previous operation, and resets the start flag to "0" (Step S17). The outputter 117 then proceeds to Step S16.

When determining that the transmission condition is not satisfied in Step S12 (Step S12; No), the data processing apparatus 100 resets the transmission flag to "0" (Step S18). Specifically, when the outputter 117 acquires conditional information indicating the value of "False" from the determiner 115, the outputter 117 resets the transmission flag to "0". Steps S13 and S18 correspond to a step of acquiring conditional information in a data processing method executed in the data processing apparatus 100.

The data processing apparatus then determines whether the previous transmission flag has been set (Step S19). In the case where the detector 116 is configured to provide a notification of a detection result indicating the end, the outputter 117 may determine whether any notification of detection of the end has been provided in Step S19.

When determining that the previous transmission flag has been set (Step S19; Yes), the outputter 117 determines that the transmission condition is switched from satisfaction to dissatisfaction, and sets the end flag to "1" (Step S20). The outputter 117 then proceeds to Step S16.

In contrast, when determining that the previous transmission flag has not been set (Step S19; No), the outputter 117 determines that the transmission condition has been dissatisfied since the previous operation, and resets the end flag to "0" (Step S21). The outputter 117 then proceeds to Step S16.

After Step S16, the data processing apparatus 100 determines whether any of the transmission flag, the start flag, and the end flag is set (Step S22). Specifically, the outputter 117 determines any one of Steps S13, S15, and S20 has been performed.

When determining that none of the flags is set (Step S22; No), the outputter 117 discards the generation data (Step S24). In contrast, when determining that any of the flags is set (Step S22; Yes), the data processing apparatus 100 transmits processing information containing the generation data generated in Step S1 and the transmission flag, the start flag, and the end flag (Step S23). Specifically, the outputter 117 outputs the generation data and the additional information, and the GW communicator 140 transmits the processing information to the receiving apparatus 30. Accordingly, when the detector 116 detects the switching between satisfaction and dissatisfaction of the transmission condition, additional information containing at least one of the start flag, indicating that the piece of generation data corresponds to the first piece among a single or successively generated pieces of generation data with respect to which the transmission condition is satisfied, and the end flag, indicating that the piece of generation data corresponds to the last piece of generation data, is generated and transmitted to the receiving apparatus 30. Step S23 corresponds to a step of outputting additional information from the outputter 117 and a step of transmitting processing information from the GW communicator 140 in the data processing method executed in the data processing apparatus 100. The data processing apparatus 100 then repeats the steps from Step S11.

As described above, in the data processing apparatus 100 according to the embodiment, the outputter 117 outputs additional information on satisfaction or dissatisfaction of the transmission condition with respect to at least one of another piece of generation data generated immediately before one piece of generation data and another piece of generation data generated immediately after the one piece of generation data, and the GW communicator 140 transmits processing information containing the one piece of generation data and the additional information to the receiving apparatus 30. The additional information enables the receiving apparatus 30 to determine whether the one piece of generation data is transmitted in succession with another piece of generation data. This configuration can therefore improve the convenience in remote use of information on the processing flow applied to the data collected from the device 20.

The data processing apparatus 100 includes the platform 110 for execution of any processing flow desired by the user, and the platform 110 includes the storage 114, the determiner 115, the detector 116, and the outputter 117. Accordingly, the collector 120 and the subprocessors 130 achieved by separately developed plug-in software are not required to have functions of the storage 114, the determiner 115, the detector 116, and the outputter 117, thereby facilitating development of the plug-in software.

In order to announce the size of a group of information while transmitting the information, a procedure has been publicly known of preliminarily declaring the size of information using a packet having a header indicating the payload length. Unfortunately, in processing flows executed in the field of FA, satisfaction of a transmission condition may be continued without limitation in some cases. In the field of FA that demands the real-time properties, generation data needs to be transmitted immediately after its generation, and this situation makes it difficult to predict the length of successive pieces of generation data with respect to which the transmission condition is satisfied.

In contrast, the data processing apparatus 100 according to the embodiment can notify the receiving apparatus 30 of the initiation and termination of successive transmission of generation data with respect to which the transmission condition is satisfied. Specifically, the receiving apparatus 30 is notified of at least one of the start and the end detected at the detector 116. The receiving apparatus 30 can therefore discriminate a group of pieces of generation data that are successively generated and transmitted, from other pieces of generation data.

Embodiment 2

Embodiment 2 is described below focusing on the differences from Embodiment 1 described above. The components identical or corresponding to those in Embodiment 1 are provided with the same reference symbols. Embodiment 2 differs from Embodiment 1 in that the additional information is a copy of the previously transmitted processing information, instead of the flags.

Figure 9:
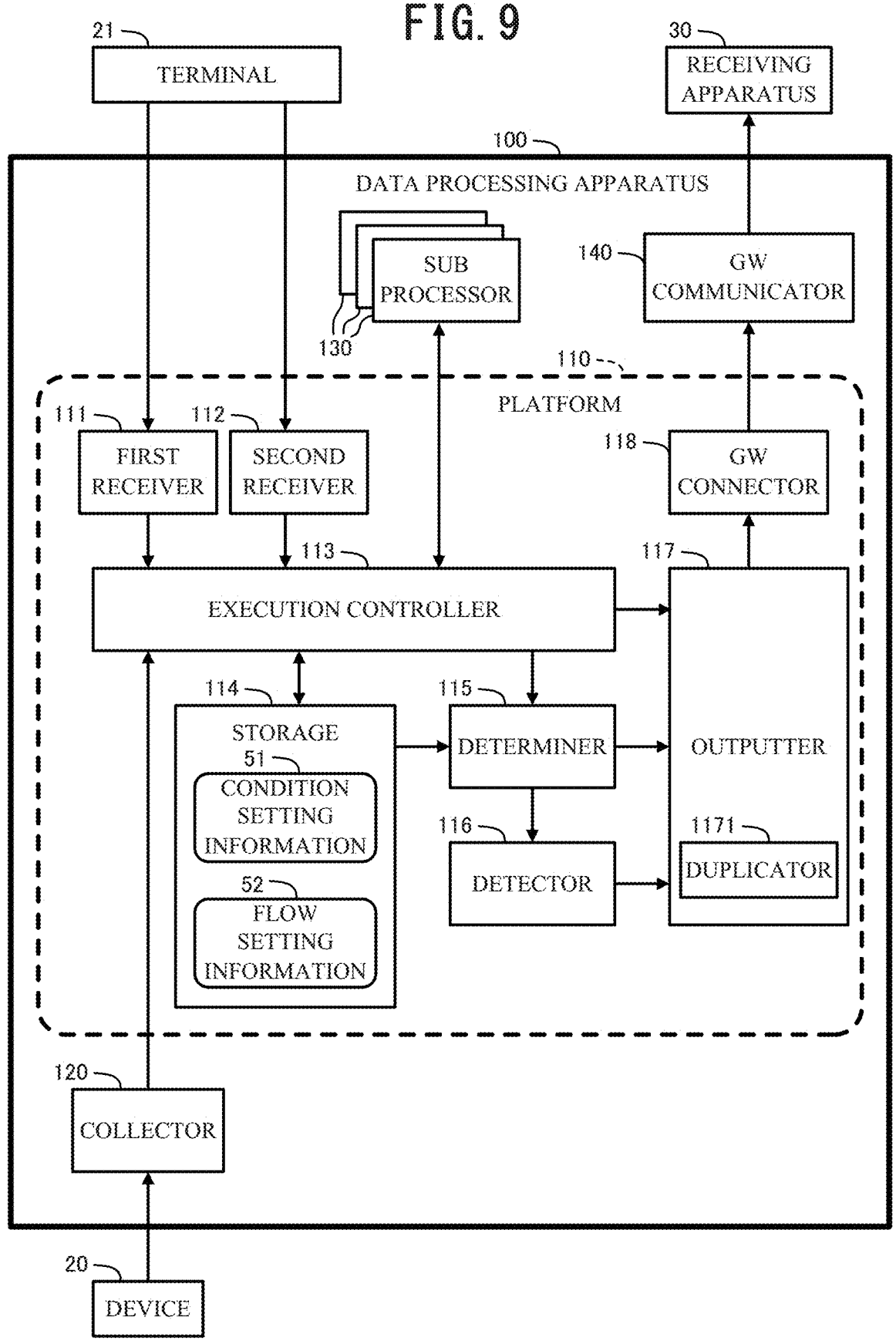
FIG. 9 illustrates a functional configuration of a data processing apparatus according to Embodiment 2.

With reference to FIG. 9, the outputter 117 of the data processing apparatus 100 according to the embodiment includes a duplicator 1171 to duplicate processing information. When being notified of detection of the end from the detector 116, the duplicator 1171 makes a copy of the previous piece of generation data and a copy of a time stamp associated with the piece of generation data, and outputs the copies as additional information.

FIG. 10 illustrates information output from the outputter 117. As is represented by the underlines in the first and second columns from the left in FIG. 10, the outputter 117 sequentially outputs pieces of generation data and time stamps in association with each other. The pieces of generation data and the time stamps associated with each other are thus transmitted from the GW communicator 140 to the receiving apparatus 30.

The arrows in FIG. 10 represent records each containing a piece of generation data corresponding to the end. Immediately after this piece of generation data corresponding to the end, the piece of generation data corresponding to the end and the time stamp associated with this piece of generation data corresponding to the end are generated and output from the outputter 117 as additional information, and then transmitted from the GW communicator 140 to the receiving apparatus 30. The pieces of additional information transmitted as described above are underlined in the first and second columns from the right in FIG. 10. Accordingly, when the detector 116 detects the switching from satisfaction to dissatisfaction of the transmission condition, a copy of the piece of generation data corresponding to the end and a copy of the time stamp to be transmitted in association with the piece of generation data are generated as additional information and are transmitted to the receiving apparatus 30.

As described above, in the case of detection of the end, the outputter 117 makes a copy of the piece of generation data corresponding to the end and a copy of the time stamp and outputs the copies. The receiving apparatus 30 does not receive redundant time stamps in general. When receiving time stamps indicating the same time point, however, the receiving apparatus 30 determines that the piece of generation data received in association with the time stamp corresponds to the end, and can thus discriminate a single or a group of successive pieces of generation data from other piece of generation data. In order to allow the receiving apparatus 30 to determine that the received redundant time stamps are additional information indicating the end, the pieces of generation data generated in the data processing apparatus 100 are provided with mutually different time stamps.

The above-described embodiments are not intended to limit the scope of the present disclosure.

For example, although the above-described embodiments are directed to an example in which the transmission condition requires the value of the generation data to be out of the predetermined range, this configuration is a mere example. For example, as illustrated in FIG. 11, the transmission condition may include at least one of a transmission initiation condition required for initiation of transmission of generation data and a transmission termination condition required for termination of transmission of generation data. In the example illustrated in FIG. 11, generation data of having a value of at least 0 is transmitted at a predetermined time pint or later. This configuration enables the receiving apparatus 30 to use processing information related to specific hours every day.

Although the additional information contains the transmission flag in Embodiment 1, the additional information may exclude the transmission flag. Immediately after the piece of generation data corresponding to the end, the data processing apparatus 100 may transmit only the additional information without transmitting the generation data with respect to which the condition is not satisfied. The data processing apparatus 100 may skip the transmission of the start flag having a value of "0" and the end flag having a value of "0". The data processing apparatus 100 may add additional information only to a piece of generation data corresponding to at least one of the start and the end. The data processing apparatus 100 may skip the transmission of either one of the start flag and the end flag. Provided that the receiving apparatus 30 can detect one of the start and the end, the receiving apparatus 30 is able to discriminate a single or a group of successive pieces of generation data from other pieces of generation data.

The additional information is not necessarily identical to the information described in Embodiments 1 and 2. For example, as illustrated in FIG. 12, the additional information may be numbers in the ascending order from 1 assigned to pieces of generation data successively generated and transmitted. The receiving apparatus 30 refers to these numbers and can thereby identify a group of pieces of generation data. The additional information may be other data indicating whether the transmission condition is satisfied with respect to at least one of another piece of generation data generated immediately before the one piece of generation data and another piece of generation data generated immediately after the one piece of generation data, provided that the receiving apparatus 30 can discriminate a single or a group of successive pieces of generation data from other pieces of generation data.

Figure 13:
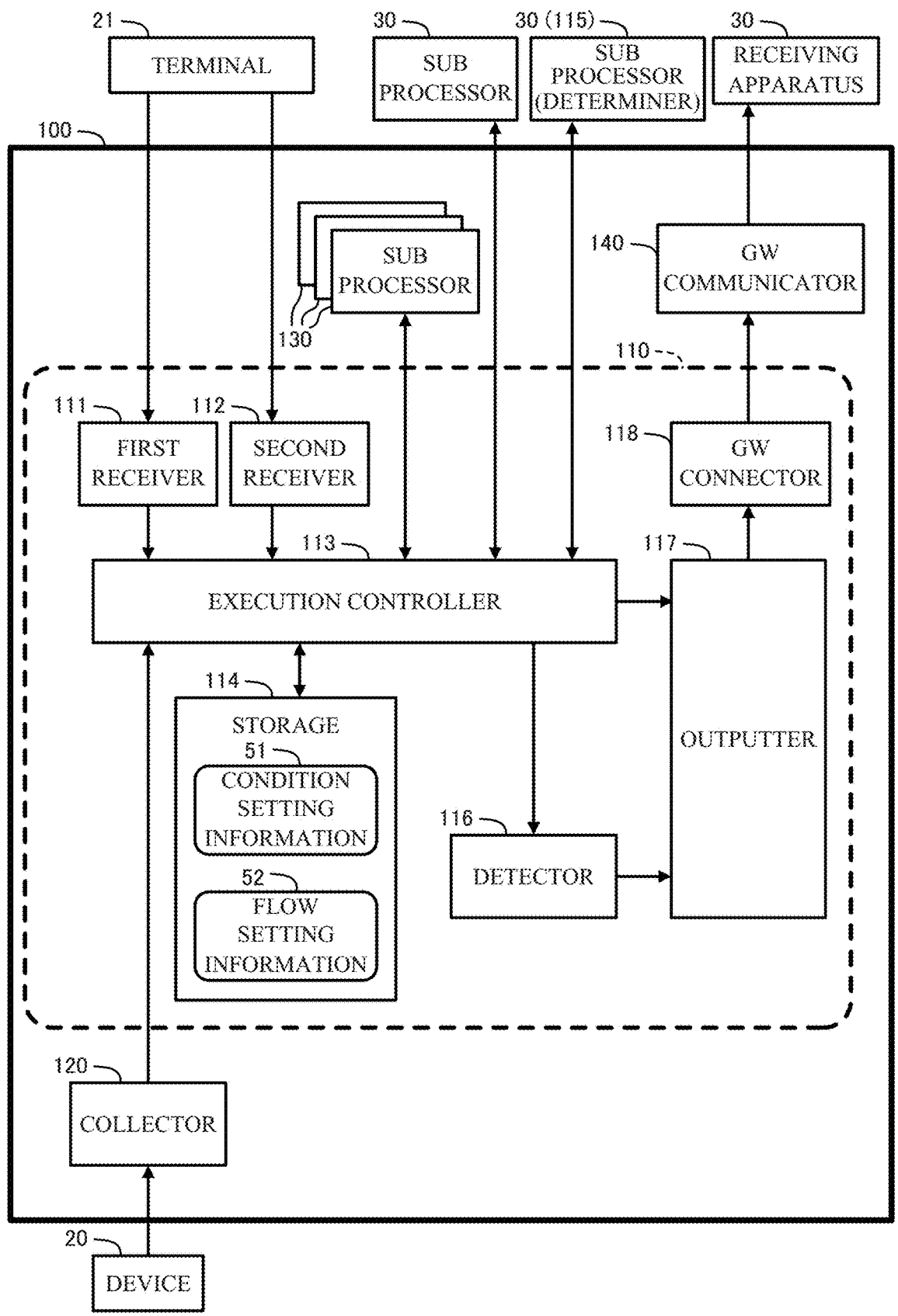
FIG. 13 illustrates a functional configuration of a data processing apparatus according to a modification.

Although the data processing apparatus 100 includes the subprocessors 130 in the above-described embodiments, this configuration is a mere example. As illustrated in FIG. 13, a part or all of the subprocessors 130 may exist outside the data processing apparatus 100. The subprocessors 130 may perform the functions of the determiner 115.

The data processing apparatus 100 may be configured without the detector 116, and the additional information may contain only the transmission flag. The receiving apparatus 30 having functions equal to those of the detector 116 can detect the start and the end on the basis of the pieces of generation data provided with the transmission flags.

The functions of the data processing apparatus 100 may be achieved by dedicated hardware or an ordinal computer system.

For example, the program P1 to be executed by the processor 11 may be stored in a non-transitory computer-readable recording medium for distribution and then installed in a computer to configure a device for performing the above-described operations. Conceivable examples of such a non-transitory recording medium include a flexible disk, a compact disc read-only memory (CD-ROM), a digital versatile disc (DVD), and a magneto-optical disc (MO).

The program P1 may also be stored in a disk drive included in a server apparatus on a communication network, represented by the Internet, and may be downloaded into a computer by being superimposed on a carrier wave, for example.

Alternatively, the program P1 may be activated while being transferred through a communication network to perform the above-described processes.

A server apparatus may execute all or part of the components of the program P1 and a computer may execute the program while transmitting and receiving information on the executed components to and from the server apparatus via a communication network, to perform the above-described processes.

In the case where the above-described functions are achieved by an operating system (OS) or by cooperation of the OS and applications, only the components other than the OS may be stored in a non-transitory medium for distribution or downloaded into a computer, for example.

The functions of the data processing apparatus 100 may also be performed by means other than software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for remote use of information on a process applied to data collected from a device.

REFERENCE SIGNS LIST

1000 Data processing system
1001 Factory
11 Processor
12 Main memory
13 Auxiliary storage
14 Inputter
15 Outputter
16 Communicator
17 Internal bus
100 Data processing apparatus
110 Platform
111 First receiver
112 Second receiver
113 Execution controller
114 Storage
115 Determiner
116 Detector
117 Outputter
1171 Duplicator
118 GW connector
120 Collector
130 Subprocessor
140 GW communicator
20 Device
21 Terminal
30 Receiving apparatus
300 Processing flow
31 Collection process
32 First modification process
33 Second modification process
34 Diagnostic process
35 Third modification process
41 to 43 External transmission process
51 Condition setting information
52 Flow setting information
P1 Program

The invention claimed is:
1. A data processing apparatus to execute a process on each piece of device data repetitively transmitted from a device and transmit processing information on the process to a receiving apparatus, the data processing apparatus comprising:
- an outputter to acquire conditional information after every generation of a piece of generation data generated in execution of the process, the conditional information indicating whether a condition for transmission of the piece of generation data to the receiving apparatus is satisfied, and when the conditional information indicates satisfaction of the condition with respect to the piece of generation data, output additional information relating to satisfaction or dissatisfaction of the condition with respect to at least one of another piece of generation data generated immediately before the piece of generation data or another piece of generation data generated immediately after the piece of generation data;
- a transmitter to transmit the processing information to the receiving apparatus, the processing information including the piece of generation data with respect to which the condition is satisfied and the additional information;
- a first receiver to receive the condition;
- a determiner to determine whether the condition is satisfied after every generation of the piece of generation data and output the conditional information;
- a second receiver to receive setting of the process, the process being a processing flow including a series of subprocesses to be applied to each piece of device data; and
- an execution controller to cause a processor to execute the subprocesses in accordance with the setting, wherein the generation data indicates a result of the subprocesses.

2. The data processing apparatus according to claim 1, further comprising:
- a detector to acquire the conditional information after every generation of the piece of generation data and detect switching between satisfaction and dissatisfaction of the condition indicated by the conditional information, wherein
- when the conditional information indicates satisfaction of the condition with respect to the piece of generation data and the switching between satisfaction and dissatisfaction of the condition is detected by the detector, the outputter generates and outputs the additional information indicating that the piece of generation data is a first or last piece of generation data among sequentially generated pieces of generation data with respect to which the condition is satisfied.

3. The data processing apparatus according to claim 2, wherein
- the transmitter transmits the piece of generation data with respect to which the condition is satisfied and a time stamp in association with each other, and
- when the conditional information indicates satisfaction of the condition with respect to the piece of generation data and the switching from satisfaction to dissatisfaction of the condition is detected by the detector, the outputter generates a copy of the piece of generation data and a copy of the time stamp to be transmitted in association with the piece of generation data as the additional information, and outputs the copies.

4. The data processing apparatus according to claim 1, wherein the first receiver to receive receives the condition comprising at least one of an initiation condition for initiating transmission of the generation data to the receiving apparatus or a termination condition for terminating transmission of the generation data to the receiving apparatus.

5. A data transmission method to be executed in a data processing apparatus, the data processing apparatus being configured to execute a process on each piece of device data repetitively transmitted from a device and transmit processing information on the process to a receiving apparatus, the method comprising:
- acquiring conditional information after every generation of a piece of generation data generated in execution of the process, the conditional information indicating whether a condition for transmission of the piece of generation data to the receiving apparatus is satisfied;
- when the conditional information indicates satisfaction of the condition with respect to the piece of generation data, outputting additional information relating to satisfaction or dissatisfaction of the condition with respect to at least one of another piece of generation data generated immediately before the piece of generation data or another piece of generation data generated immediately after the piece of generation data;
- transmitting the processing information to the receiving apparatus, the processing information including the piece of generation data with respect to which the condition is satisfied and the additional information;
- receiving a setting of the process, the process being a processing flow including a series of subprocesses to be applied to each piece of device data; and
- causing the data processing apparatus to execute the subprocesses in accordance with the setting, wherein the generation data indicates a result of the subprocesses.

6. A non-transitory computer-readable recording medium storing a program for a computer for executing a process on each piece of device data repetitively transmitted from a device and transmitting processing information on the process to a receiving apparatus, the program causing the computer to:
- acquire conditional information after every generation of a piece of generation data generated in execution of the process, the conditional information indicating whether a condition for transmission of the piece of generation data to the receiving apparatus is satisfied;
- when the conditional information indicates satisfaction of the condition with respect to the piece of generation data, output additional information relating to satisfaction or dissatisfaction of the condition with respect to at least one of another piece of generation data generated immediately before the piece of generation data or another piece of generation data generated immediately after the piece of generation data;
- transmit the processing information to the receiving apparatus, the processing information including the piece of generation data with respect to which the condition is satisfied and the additional information;
- receiving a setting of the process, the process being a processing flow including a series of subprocesses to be applied to each piece of device data; and
- execute the subprocesses in accordance with the setting, wherein the generation data indicates a result of the subprocesses.

* * * * *